US006519560B1

(12) United States Patent
Spicer et al.

(10) Patent No.: US 6,519,560 B1
(45) Date of Patent: Feb. 11, 2003

(54) METHOD FOR REDUCING TRANSMISSION BIT RATE IN A TELECOMMUNICATION SYSTEM

(75) Inventors: John Joseph Spicer, Lockerley (GB); Peter Chambers, Ringwood (GB)

(73) Assignee: Roke Manor Research Limited, Romsey (GB)

( * ) Notice: Subject to any disclaimer, the term of this patent is extended or adjusted under 35 U.S.C. 154(b) by 0 days.

(21) Appl. No.: 09/535,989

(22) Filed: Mar. 27, 2000

(30) Foreign Application Priority Data

Mar. 25, 1999 (GB) ............................................ 9906763

(51) Int. Cl.[7] .......................... G10L 15/00; G10L 19/00
(52) U.S. Cl. ....................................... 704/231; 704/500
(58) Field of Search ................................ 704/210, 219, 704/220, 222, 231, 233, 506

(56) References Cited

U.S. PATENT DOCUMENTS

| | | | | | |
|---|---|---|---|---|---|
| 4,661,915 | A | | 4/1987 | Ott | 364/513.5 |
| 4,707,858 | A | | 11/1987 | Fette | 381/43 |
| 4,799,261 | A | | 1/1989 | Lin et al. | 381/36 |
| 5,006,849 | A | | 4/1991 | Baarman et al. | 341/95 |
| 5,305,421 | A | | 4/1994 | Li | 704/219 |
| 5,481,642 | A | * | 1/1996 | Shoham | 704/219 |
| 5,649,051 | A | * | 7/1997 | Rothweiler et al. | 704/222 |
| 5,668,925 | A | * | 9/1997 | Rothweiler et al. | 704/220 |
| 5,706,392 | A | * | 1/1998 | Goldberg et al. | 704/210 |
| 5,718,992 | A | * | 2/1998 | Shoham | 704/219 |
| 5,819,218 | A | * | 10/1998 | Hayata et al. | 704/233 |
| 5,839,098 | A | * | 11/1998 | Laroia et al. | 704/203 |
| 5,845,244 | A | * | 12/1998 | Proust | 704/220 |

FOREIGN PATENT DOCUMENTS

| | | |
|---|---|---|
| EP | 0 706 172 | 4/1996 |

* cited by examiner

*Primary Examiner*—Susan McFadden
(74) *Attorney, Agent, or Firm*—Crowell & Moring LLP

(57) ABSTRACT

In a method and apparatus for reducing the bit rate of transmitted signals in a telecommunications system, a speech recognition device is operated in parallel with a speech coding device in a transmitter terminal. An analog input signal from a microphone is digitized in an analog-to-digital converter to provide a digital signal which is applied to both the speech coding device and the speech recognition device. An output signal for transmission via an antenna is formed by combining output signals from the speech coding device and the speech recognition device via a switch, recognized speech being converted to codewords which replace packets or sequences of packets of the coded signal corresponding thereto. In a receiver terminal, an antenna receives the transmitted signal and passes it to both a speech coding device and a speech generator prior to being converted to an analog signal for a speaker. The speech generator recognizes codewords present in the signal, converts them back to digital signals and then overwrites a digital signal from speech coding device via switch to reconstruct the complete signal prior to being passed to digital-to-analog converter.

6 Claims, 4 Drawing Sheets

METHOD FOR REDUCING TRANSMISSION BIT RATE IN A TELECOMMUNICATION SYSTEM

The present invention relates to improvements in or relating to telecommunication systems and is more particularly concerned with lowering the bit rate required for speech transmission in such systems.

Telecommunications systems include both ‘wired’ systems, for example, standard telephony land lines, and ‘wireless’ systems, for example, mobile or cellular systems, and each system requires that the bit rate for speech transmission be lowered to optimise its transmission carrying capacity. For example, a mobile system comprises a plurality of cells, each cell being defined by at least one base station and a plurality of mobile terminals and having a predetermined maximum capacity. When a connection is made between a pair of terminals, namely, a transmitting terminal and a receiving terminal, speech to be transmitted is input at a microphone in the transmitting terminal as an analogue signal. The analogue signal is digitised to provide a digital signal which has a predetermined bit rate, typically, 64 kbit/s. The digital signal is then passed to a speech coding device which analyses the sounds in the signal and codes it for transmission on a predetermined channel to a receiver in the receiving terminal. Typically, the bit rate for the transmission is 8 kbit/s. The receiver decodes the transmitted signal and converts it to an analogue signal which can then be broadcast through a speaker in the receiving terminal. The coded digital signal is normally transmitted from terminal to terminal via a base station.

When a plurality of terminals are transmitting at the same time in a cell, the cell may approach its predetermined maximum capacity and, as a result, the number of connections in that cell may be restricted. Furthermore, or a transmission bit rate of 8 kbit/s, relatively high bandwidth channels may be required.

It is therefore an object of the present invention to provide a method of reducing the bandwidth requirements for speech transmission.

In accordance with one aspect of the present invention, there is provided a method for reducing transmission bit rate in a telecommunications system, the method comprising the steps of:

a) receiving a signal at a microphone;

b) converting the received signal to a coded signal for transmission;

c) recognising speech; and d) replacing parts of the coded signal with codewords representative of the recognised speech.

In one embodiment, steps b) and c) are carried out simultaneously. In another embodiment, step c) is carried out prior to step b). In a further embodiment, step b) is carried out prior to step c).

Advantageously, increased battery life may be achieved if a discontinuous transmit mode is used, lower bandwidth channels may be utilised, and higher cell capacity may be achieved. This is particularly true for code division multiple access (CDMA) systems.

The term ‘recognised speech’ is intended to encompass not only words, phrases or sentences, but sounds which make up parts of words.

For a better understanding of the present invention, reference will now be made, by way of example only, to the accompanying drawings in which.

The present invention is to be described with reference to a mobile or cellular telecommunications system, but it will readily be appreciated that it is not limited thereto and is equally applicable to all telecommunications systems in which speech transmission bit rates require to be lowered.

It will readily be appreciated that a speech coding device operates by analysing the sounds of a voice and sending that voice in a coded form which can be recreated at a receiver. A conventional speech coding device arrangement is shown in FIG. 1.

Figure 1:
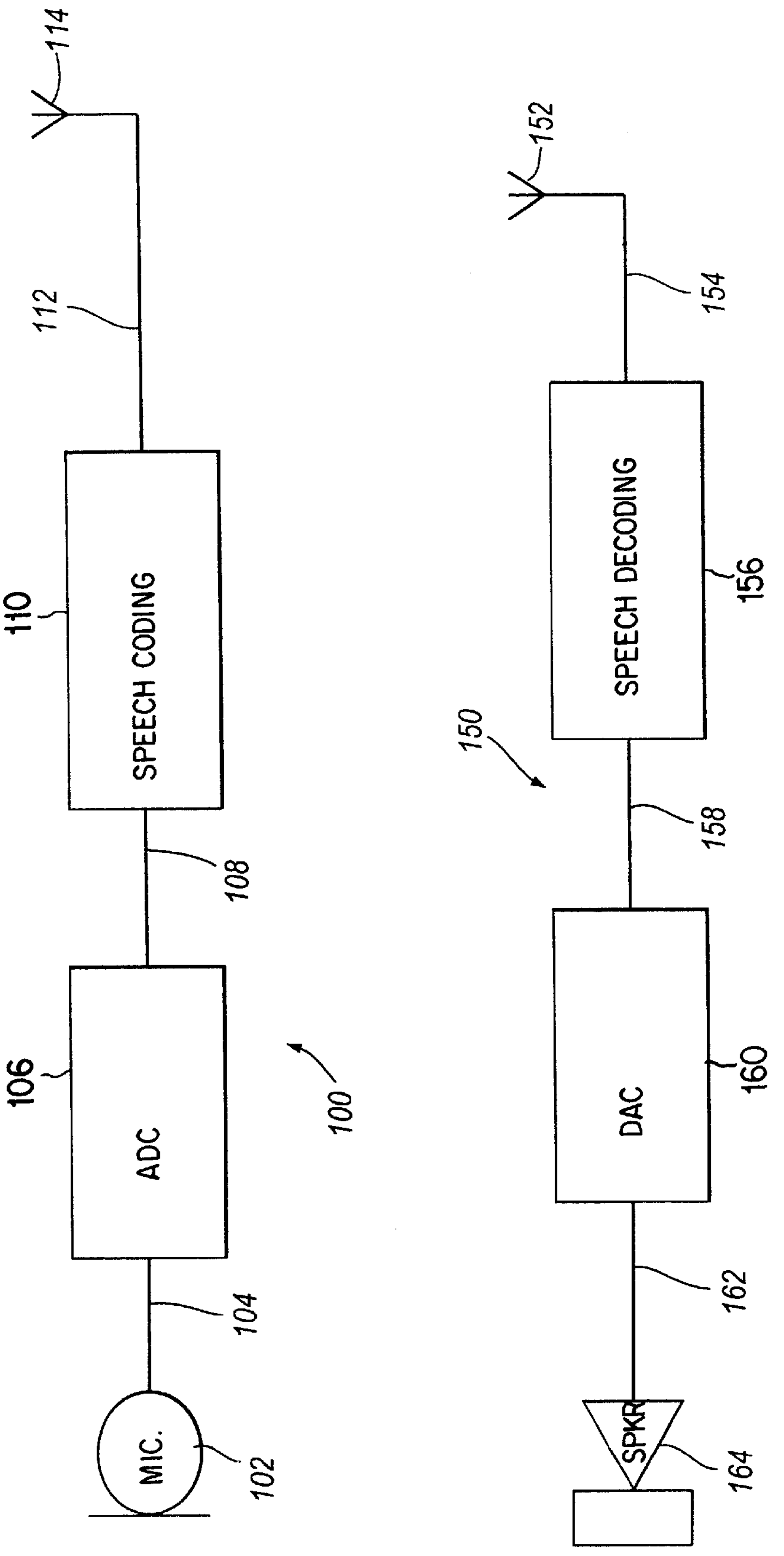
FIG. 1 is a block diagram of a conventional connection for speech transmission.

In FIG. 1, a transmitting mobile terminal 100 is shown. A voice message to be transmitted is input to a microphone 102 which produces an analogue signal 104 which corresponds to the input voice message. The analogue signal 104 is fed to an analogue-to-digital converter (ADC) 106 where it is digitised to produce digital signal 108. The digital signal 108 is pulse code modulated (PCM) and has a bit rate of 64 kbit/s. Signal 108 is fed to a speech coding device 110 where it is coded to provide a coded signal 112 for transmission by antenna 114 on a predetermined broadcast channel.

Also shown in FIG. 1 is a receiving mobile terminal 150 which receives the coded signal 112 at receiving antenna 152. Received signal 154 from antenna 152 is passed to a speech decoding device 156 where it is decoded to produce decoded signal 158. Decoded signal 158 is fed to a digital-to-analogue converter (DAC) 160 to produce an analogue signal 162 which is then fed to a speaker 164.

It will readily be appreciated that for one mobile terminal, the transmitting antenna and receiving antenna may be the same. Moreover, a mobile terminal may transmit and receive on different channels.

A normal speech coding device operates by analysing the sounds of a voice and transmitting a coded form thereof by which the sounds can be recreated at a receiver. The coded signal may comprise a fixed number of bits or a packet which represent a fixed duration, for example, the coded signal may comprise digital packets in which 80 bits are required to transmit 10 ms of speech, that is, a bit rate of 8 kbit/s.

In one embodiment of the present invention, a speech recognition device is arranged to operate in parallel with a speech coding device. This is illustrated in FIG. 2.

Figure 2:
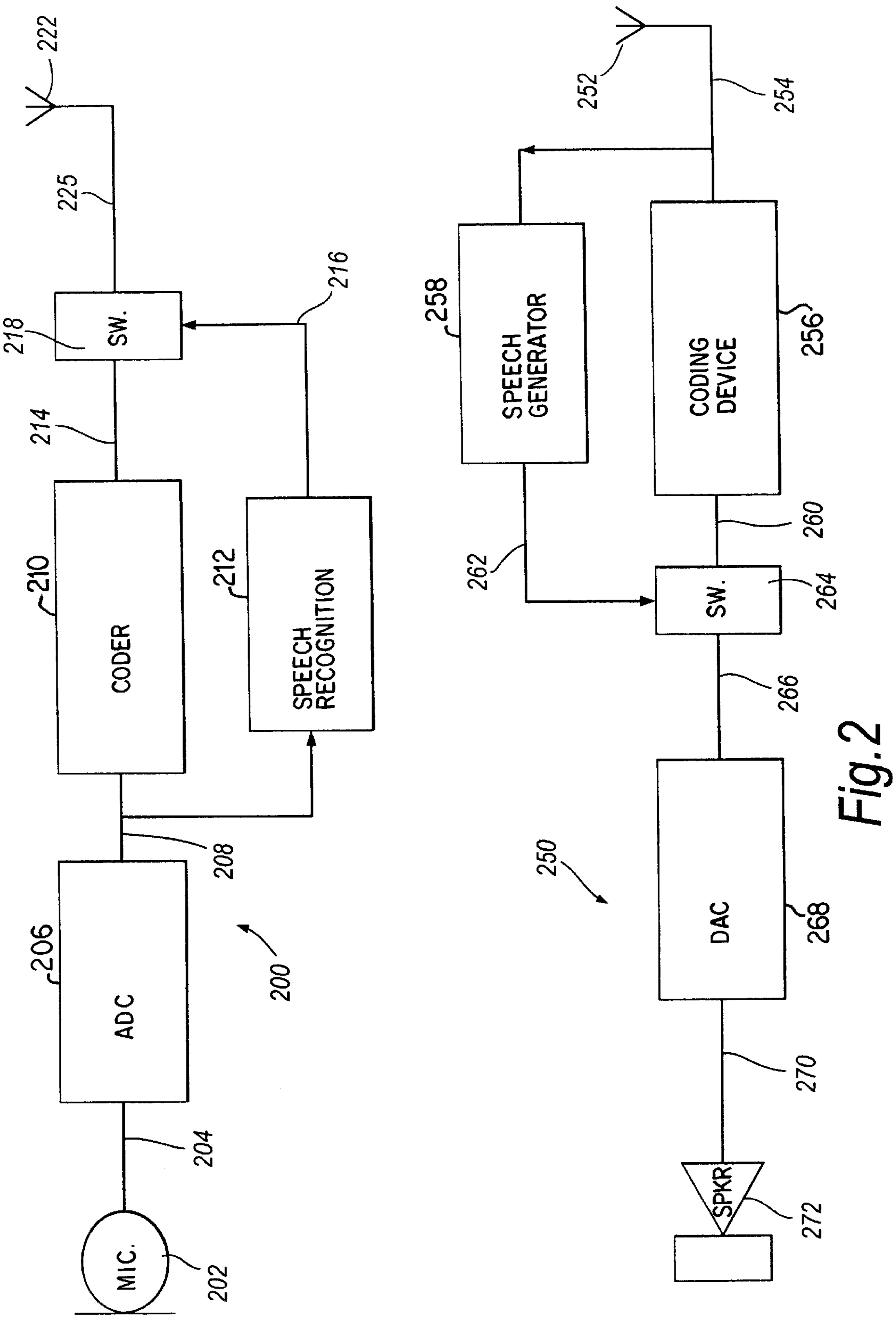
FIG. 2 is a block diagram of one embodiment of a connection for speech transmission in accordance with the present invention.

A transmitting mobile terminal 200 and a receiving mobile terminal 250 are shown in FIG. 2. Transmitting terminal 200 comprises a microphone 202, an ADC 206, and coding device 210 which are identical to microphone 102, ADC 106 and coding device 110 of FIG. 1. Microphone 202 provides an analogue signal 204 to ADC 206 which converts it into a digital signal 208. Digital signal 208 comprises a PCM signal having a bit rate of 64 kbit/s. Signal 208 is input to coding device 210 and also to a speech recognition device 212 as shown. Respective output signals 214, 216 from the coding device 210 and the speech recognition device 212 are passed to a switch 218. When the speech recognition device 212 recognises a word or phrase, it produces signal 216 which comprises a codeword corresponding to the recognised word or phrase. Switch 218 is operated by speech recognition device 212 to switch between signals 214 and 216 to form output signal 220 for transmission by transmitting antenna 222. Output signal 220 comprises a coded signal which is interspersed with codewords corresponding to words or phrases which have been recognised by the speech recognition device 212.

It will be appreciated that, as an alternative to the speech recognition device 212 controlling the switch 218, both may be connected to control means (not shown) which receives signals from the speech recognition device 212 to control the switch 218 in accordance with a recognised word or phrase. The control means may then operates the switch 218 so that the codewords are added into the output signal 220 to replace the code produced by the coding device 210 relating to the recognised word or phrase, prior to transmission by antenna 222.

Digital signal 208 has a bit rate of 64 kbits/s as described above with reference to signal 108 in FIG. 1. As mentioned above, signal 220 to be transmitted comprises digital packets and codewords, the codewords having 32 bits, for example. This means that, when codewords are used to replace some of the digital packets which are being transmitted at a bit rate of 8 kbit/s, bit rate of less than 8 kbit/s can be achieved. Naturally, a further reduction in bit rate can be achieved if the codewords have less than 32 bits.

Receiving terminal 250 comprises an antenna 252 which receives the coded signal corresponding to a voice signal and provides signal 254 for coding device 256 and speech generator 258. Coding device 256 is identical to coding device 156 (FIG. 1) and decodes signal 254 to provide a digital signal 260 corresponding thereto. However, coding device 256 cannot decode any codewords present in signal 254. Speech generator 258 recognises codewords which have been included in signal 254 and provides an output digital signal 262 corresponding thereto. Both digital signals 260, 262 are input to switch 264 which is controlled by the speech generator 258 to intersperse signals corresponding to recognised codewords with the standard coding. Digital signal 266 is fed to a DAC 268 where it is converted into analogue signal 270 for supply to speaker 272, DAC 268 and speaker 272 corresponding to DAC 160 and speaker 164 in FIG. 1.

Speech generator 258 and switch 264 may be connected to control means (not shown) in a similar way to that described above in relation to the speech recognition device and the switch in the transmitting terminal. Here, the control means receives signals indicating that codewords have been recognised from the speech generator and uses these signals to control the operation of switch 264 to provide a reconstructed digital signal 266.

As mentioned above with reference to FIG. 1, the transmitting antenna and receiving antenna may be the same for any one mobile terminal, and that terminal may transmit and receive on different channels.

In another embodiment of the present invention, a speech coder recognition device is utilised at the output of the speech coding device. This is illustrated in FIG. 3.

Figure 3:
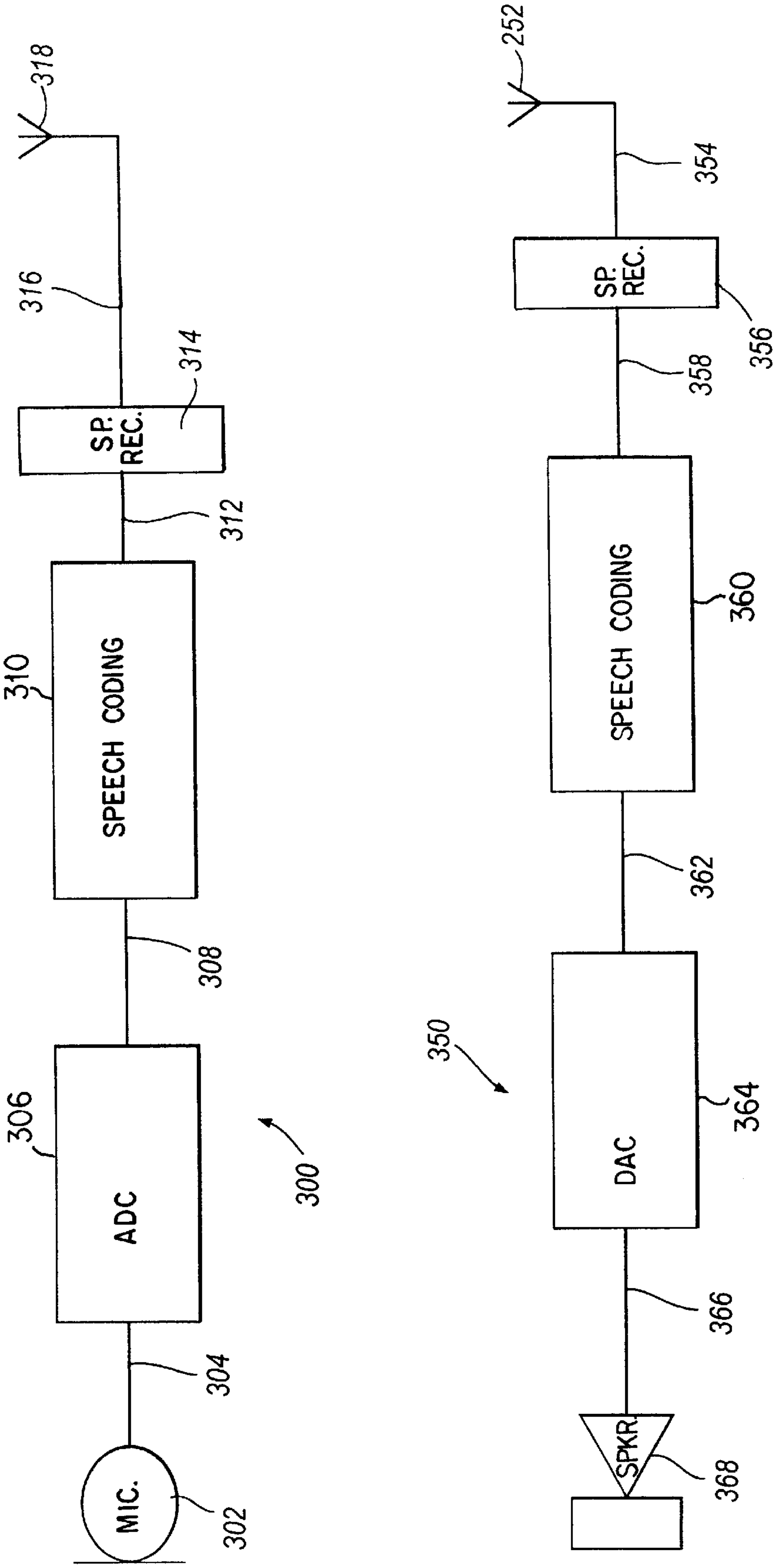
FIG. 3 is a block diagram of a second embodiment of a connection for speech transmission in accordance with the present invention.

A transmitting terminal 300 and a receiving terminal 350 are shown in FIG. 3. Transmitting terminal 300 comprises a microphone 302, a ADC 306, and a speech coding device 310 which are identical to microphone 202, ADC 206 and speech coding device 210 of FIG. 2. Microphone 302 produces analogue signal 304 which is converted to digital signal 308 by ADC 306. Speech coding device 310 converts the digital signal 308 into a coded signal 312 which is similar to coded signal 214 of FIG. 2. Coded signal 312 is then passed to a speech coder recognition device 314 which produces an output signal 316 for transmission by transmitting antenna 318. Output signal 316 comprises signal 312 which has been overwritten with codewords representative of recognised packets or sequences of packets present therein so that the bits corresponding to the recognised packets or sequences of packets are replaced with bits corresponding to the codewords to reduce the overall bit rate.

Receiving terminal 350 comprises an antenna 352 for receiving the transmitted output signal 316. Antenna 352 produces signal 354 which is representative of the received signal. Signal 354 passes to a speech coder recognition device 356 which replaces recognised codewords with packets or sequences of packets corresponding thereto to form signal 358. Signal 358 is then passed to a speech coding device 360 where the packets or sequences of packets are converted into a digital signal 362 which is then converted in DAC 364 to an analogue signal 366 for supply to speaker 368.

The codewords may be generated by a Lempel-Ziv type algorithm or by some other feed-forward compression algorithm. Alternatively, the codewords may be derived from a fixed set. The speech coder recognition device 356 in receiving terminal 350 has copies of codewords and their corresponding packets or sequences of packets and re-inserts the packets or sequences thereof when it receives the appropriate codewords. In recognising a packet or sequence of packets, some form of "near matching" is allowed. This method is language independent.

In another embodiment of the present invention, a word/sound recognition device is operated at the input to the speech coding device in the transmitting terminal. This is shown in FIG. 4.

Figure 4:
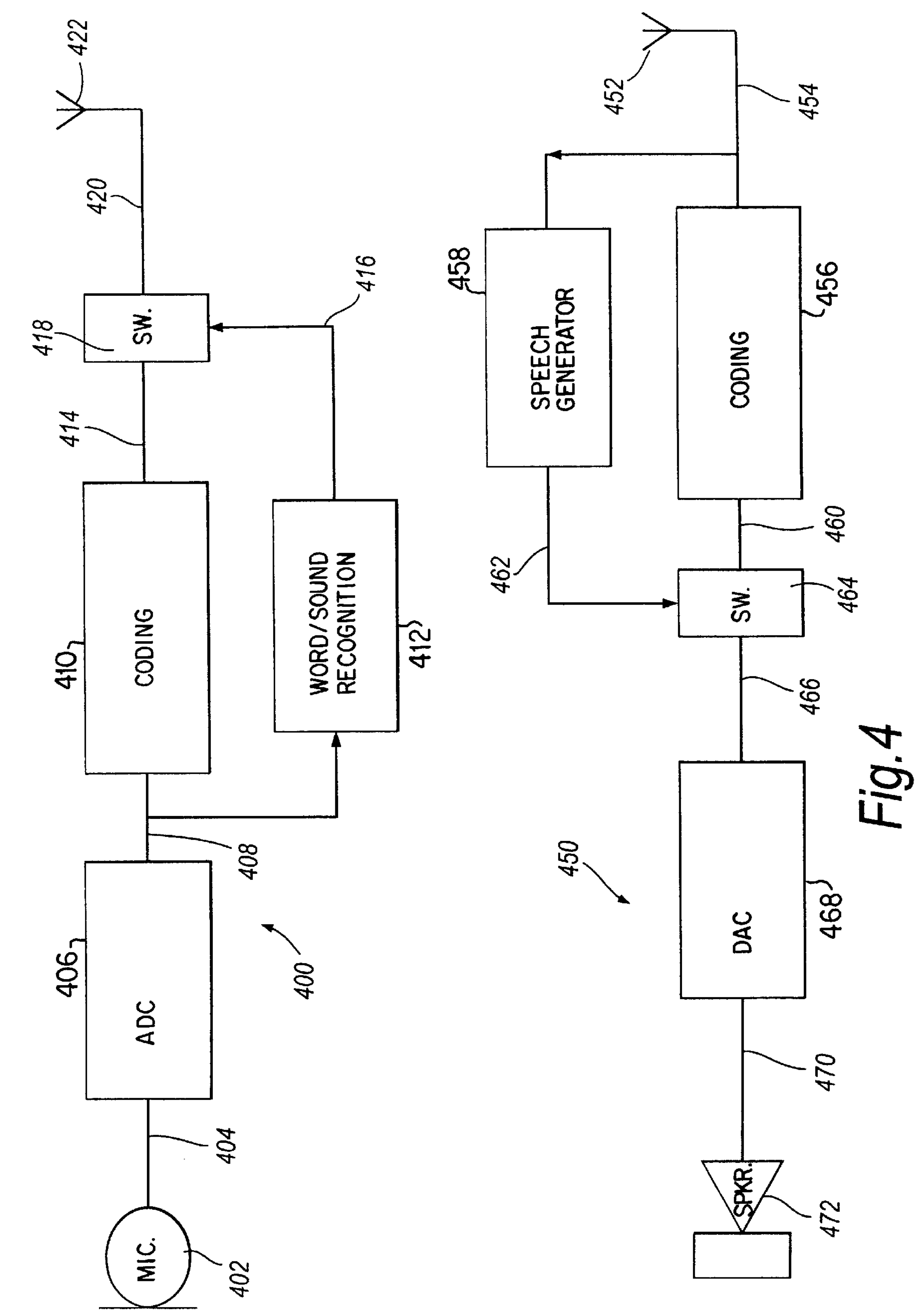
FIG. 4 is a block diagram of a further embodiment of the invention, in which a word/sound recognition device is operated at the input to the speech coding device in the transmitting terminal.

A transmitting terminal 400 and receiving terminal 450 are shown in FIG. 4. Transmitting terminal 400 comprises a microphone 402, an ADC 406, and coding device 410 which are identical to microphones 102, 202, ADCs 106, 206 and coding devices 110, 210 of FIGS. 1 and 2 respectively. Microphone 402 provides an analogue signal 404 to ADC 406 which converts it into a digital signal 408. Digital signal 408 is input to coding device 410 and also to a wordl/sound recognition device 412 as shown. Respective output signals 414, 416 from the coding device 410 and the word/sound recognition device 412 are passed to a switch 418. When the word/sound recognition device 412 recognises a word or sound, it produces signal 416 which comprises a codeword corresponding to the recognised word or sound. Switch 418 is operated by word/sound recognition device 412 to switch between signals 414 and 416 to form output signal 420 for transmission by transmitting antenna 422. Output signal 420 comprises a coded signal which is interspersed with codewords corresponding to recognised words or sounds.

Receiving terminal 450 comprises an antenna 452 which receives the coded signal and provides signal 254 for coding device 456 and speech generator 458. Coding device 456 is identical to coding devices 156, 256 (FIGS. 1 and 2 respectively) and decodes signal 454 to provide a digital signal 460 corresponding thereto. However, coding device 456 cannot decode any codewords present in signal 454. Speech generator 458 recognises codewords which have been included in signal 454 and provides an output digital signal 462 corresponding thereto. Both digital signals 460, 462 are input to switch 464 which is controlled by the speech generator 458 to intersperse signals corresponding to recognised codewords with the standard coding. Digital signal 466 is fed to a DAC 468 where it is converted into analogue signal 470 for supply to speaker 472, DAC 468 and speaker

472 corresponding to DACs 160, 268 and speakers 164, 372 in FIGS. 1 and 2 respectively.

In this embodiment of the present invention, frequently used words or sounds can easily be replaced, for example, the words 'and' and 'the' and the sounds 'sh' 'th'. This embodiment could be particularly useful for trained operators with a limited vocabulary. In recognising the word or sound, some form of "near matching" is allowed. This method reduces the bit rate when words or sounds are recognised and is of particular interest when the processing requirements of the speech coding device is high.

In all the embodiments described above, a lower bit rate results when words, phrases or sounds are recognised. However, if there is no recognition, nothing is lost as normal bit rates will apply.

Although the embodiments of FIGS. 2 to 4 illustrate the devices which provide speech coding and decoding as being separate to the ADCs and DACs respectively, it will readily be appreciated that the ADC may form an integral part of the speech coding device, and the DAC may form an integral part of the speech decoding device.

Moreover, bit rates different to those described above may be implemented in the telecommunications system according to the requirements of the particular application.

What is claimed is:

1. A method for reducing transmission bit rate in a telecommunications system, the method comprising the steps of:

a) receiving a signal at a microphone;

b) in a coding device, converting the received signal to a coded signal for transmission, such that the coded signal can be restored at a receiver;

c) in a speech recognition device, recognizing speech contained in the received signal;

d) via a switch, replacing parts of the coded signal with codewords representative of the recognized speech to form an output signal; and e) transmitting the output signal via a transmitting antenna to the receiver.

2. A method according to claim 1, wherein steps b) and c) are carried out simultaneously.

3. A method according to claim 1, wherein step c) is carried out prior to step b).

4. A method according to claim 1, wherein step b) is carried out prior to step c).

5. A method for reducing a transmission bit rate in a telecommunications system, said method comprising:

receiving an analog speech signal at a microphone;

digitizing signals generated by said microphone;

applying digitized signals to a first speech coding device and to a speech recognition device;

combining output signals from the first speech coding device and the speech recognition device, such that recognized speech converted into codewords by said speech recognition device replaces packets or sequences of packets of corresponding coded signals from the first speech coding device;

transmitting the combined output signals.

6. The method according to claim 5, further comprising:

receiving transmitted signals and passing them to a second speech coding device and to a speech generator;

combining outputs from the second speech coding device and the speech generator, such that recognized codewords that are converted back to digital signals in the speech generator are used to overwrite digital signals generated by the second speech coding device to reconstruct a complete signal; and passing the reconstructed signal through a digita-to-analog converter.

* * * * *